United States Patent [19]
Drake

[11] Patent Number: 4,666,490
[45] Date of Patent: May 19, 1987

[54] AQUEOUS WASTE VITRIFICATION PROCESS AND APPARATUS

[76] Inventor: Ronald N. Drake, 14075 Pomegranate Ave., Poway, Calif. 92064

[21] Appl. No.: 828,857

[22] Filed: Feb. 12, 1986

[51] Int. Cl.$^4$ .............................................. C03B 5/02
[52] U.S. Cl. ..................................... 65/27; 65/19; 65/45; 65/62; 65/168; 65/134; 65/181
[58] Field of Search ................. 65/45, 62, 181, 19, 65/27, 168, 134

[56] References Cited

U.S. PATENT DOCUMENTS

| | | | |
|---|---|---|---|
| 1,454,082 | 5/1923 | Schlösser | 65/19 |
| 3,321,409 | 5/1967 | Grover et al. | |
| 3,647,405 | 3/1972 | Smith | 65/181 X |
| 3,880,629 | 4/1975 | Dulin et al. | 65/168 X |
| 3,942,966 | 3/1976 | Kroyer et al. | |
| 4,020,004 | 4/1977 | Schulz et al. | |
| 4,065,282 | 12/1977 | Morey | 65/181 X |
| 4,242,551 | 2/1981 | Nishimura | |
| 4,297,304 | 10/1981 | Scheffler et al. | |
| 4,299,611 | 11/1981 | Penberthy | 65/27 |
| 4,309,204 | 1/1982 | Brooks | |
| 4,353,725 | 10/1982 | Hohman et al. | |
| 4,376,070 | 3/1983 | Pope et al. | |
| 4,422,862 | 12/1983 | Wardlaw | |
| 4,424,149 | 1/1984 | Bege et al. | |

OTHER PUBLICATIONS

*The CRC Handbook of Chemistry and Physics*, 55th ed. CRC Press, pp. E-6 through E-9 (1974).

*Primary Examiner*—Arthur Kellogg
*Attorney, Agent, or Firm*—Sheridan, Ross & McIntosh

[57] ABSTRACT

A process is provided for treating an aqueous stream of nonradioactive hazardous waste containing inorganic compounds capable of forming oxides upon thermal treatment in which at least one of the oxides is a glass former, glass intermediate or a glass modifier. The process comprises (a) introducing the waste stream into a thermal treatment zone; (b) heating the inorganic compounds in the thermal treatment zone to convert the compounds to the corresponding inorganic oxides and form a melt solution while vaporizing volatile components to form an off-gas; (c) scrubbing the off-gas to provide a ventable flue gas and a liquid condensate with the condensate being recycled to the thermal treatment zone; and (d) removing the melt solution from said thermal treatment zone and cooling the melt solution to form a nonleachable glass containing the hazardous waste. An apparatus particularly adapted to practice the process is also provided.

18 Claims, 1 Drawing Figure

AQUEOUS WASTE VITRIFICATION PROCESS AND APPARATUS

BACKGROUND OF THE INVENTION

This invention relates to a process for converting nonradioactive hazardous chemical wastes into inert, nonleachable glass billets.

A major problem which exists in modern industry is the generation of liquid hazardous waste. This is particularly true in the production of semiconductors, plastics and in the metal refining, electroplating, petroleum and other industries. Current Environmental Protection Agency regulations prohibit the landfilling of liquid hazardous wastes after Jan. 1, 1986, thus eliminating the major current disposal technology. Other methods for the disposal of hazardous wastes include incineration and solidification in cement. The cement solidification technology is expensive and increases the waste volume. Incineration processes do not readily lend themselves to the treatment of materials which form hazardous inorganic oxides since these materials would remain as ash after the incineration process. This is particularly true when the waste material contains heavy or toxic metals such as lead, mercury, cadmium, beryllium, nickel, vanadium and others. The particular difficulty with such metallic pollutants is their stability. While organic substances are degradable by natural processes or by pyrolysis, metals are not degradable. The residue from the pyrolysis of metallics can be leached into groundwater by natural chemical reactions and thereby enter the food chain.

Consequently there is a need for a process which can be used to convert hazardous wastes to materials which can be safely and conveniently landfilled.

A method which has been used to dispose of radioactive liquid wastes is the formation of solid bodies which incorporate such wastes. For example, U.S. Pat. No. 3,321,409 of Grover et al. (1967) is directed to a process for producing a fused glass which contains radioactive waste oxides. This process involves introducing into a container an aqueous solution containing the radioactive wastes. Solid, substantially dry particles consisting of glass forming materials are separately fed into the container. The container is heated to remove the water with continued heating to effect complete fusion of the glass forming material and the radioactive waste into a leach resistant glass.

U.S. Pat. No. 4,020,004 of Schulz et al. (1977) is directed to the immobilization of complex radioactive cesium ferrocyanides by incorporating these materials in a dense insoluble glass. The waste materials are mixed with the glass forming constituents in a dry state and then melted and allowed to solidify. It is disclosed that the ferrocyanides must be fused with sodium carbonate and a mixture of (a) basalt and boron trioxide or (b) silica and lime.

Scheffler et al. in U.S. Pat. No. 4,297,304 (1981) disclose a number of disadvantages with the processes described in the foregoing patents. During the high temperature stages of these processes, significant quantities of radioactive substances evaporate from the not yet solidified waste. Complicated filters, gas washing columns and condensate separators are required to recapture these materials. Also there are troublesome corrosion problems encountered during the melting of the glass. To overcome these problems, Scheffler et al. remove most of the water to form a concentrate which is then combined with a clay like substance by kneading the mixture. The resulting mixture is formed into a molded body which is calcined at temperatures up to about 800° C. and then fired at temperatures between 800° and 1400° C. to form practically undissolvable mineral phases. The molded body is enclosed on all sides in a dense, continuous ceramic or metallic matrix. This process has the disadvantage of requiring multiple steps and the transfer of the waste materials from a concentrator to a mixer and subsequently to the final calcining device.

U.S. Pat. No. 4,376,070 of Pope et al. (1983) discloses that a problem exists in mixing oxide waste with glass forming constituents. It is taught that phase separation can occur during the melting process resulting in a heterogeneous glass which is lacking in chemical durability. The process disclosed in this patent attempts to solve this problem by partially hydrolyzing the glass formers, for example silicates, and then mixing these materials with the nuclear waste. The resulting mixture is heated to remove any organic materials and water and dry the composition. The dried composition is then melted and cooled to form glass.

U.S. Pat. No. 4,424,149 of Bege et al. (1984) discloses a method for disposing of radioactive borate containing liquids and ion exchange resins. This patent discloses that the wastes are preferably concentrated by predrying prior to adding glass forming materials although the wastes can be mixed directly with glass formers in liquid form. If the liquid waste mix is fed directly to a melter, first the water evaporates and then the solid components are melted. The organic materials such as the ion exchange resins burn leaving a dry residue and which is incorporated in the glass melt. It is also disclosed that the melting process can be carried out in steps, i.e. a charge of the glass forming composition can be fed into a vessel and then melted. This procedure is repeated with additional charges until the vessel is filled to the desired height with melt. The waste gases evolved during the melting process can be purified by passage through a gas washer and/or a filter. A preferred apparatus for performing the melting operation is an electric glass melting furnace with a tight enclosure.

These references collectively teach that a vitrification process must be specifically adapted to the particular waste material which is being treated. Also the processes disclosed are complex, batch operations in which the cost can only be justified when dealing with small quantities of radioactive materials that can not be effectively treated in any other manner.

Applicants have found a vitrification process which can effectively and efficiently treat nonradioactive wastes to produce nonleachable glass matrices which are suitable for landfill disposal. In addition, the processes and apparatus disclosed herein permit continuous operation. The continuous operation provides an economical method of treating hazardous inorganic oxide-forming wastes. This is in contrast with the batch operations disclosed in the patents cited hereinabove.

SUMMARY OF THE INVENTION

It is therefore an object of the present invention to provide a process which can be used to treat aqueous wastes which contain nonradioactive hazardous inorganic oxide forming materials. It is a further object of the instant invention to provide a process which can additionally treat aqueous wastes which contain cyanides and small quantities of hazardous organic materials. It is a further object of the instant invention to provide a process which concentrates the hazardous inorganic oxides into vitrious nonleachable form which can be safely landfilled, or be formed into shapes for commercial sale. It is another object of the instant invention to provide an apparatus for performing the instant process.

To achieve these objects, one embodiment of the present invention comprises a process for the treatment of an aqueous stream of waste containing nonradioactive hazardous inorganic salts or cations in solution capable of forming oxides upon thermal treatment wherein at least one of said oxides is selected from the group consisting of glass formers, glass intermediates and glass modifiers. The waste stream is introduced into a thermal treatment zone where it is heated to convert the soluble cations or salts to the corresponding inorganic oxides and form a melt solution. Volatile components present are vaporized to form an off-gas. The off-gas is scrubbed to provide a ventable flue gas and a liquid condensate which is recycled to the thermal zone. The melt solution is removed from the thermal zone and cooled to form a nonhazardous glass encapsulating the metal cations.

In another embodiment the instant invention comprises a substantially continuous process for the treatment of an aqueous stream of hazardous waste comprising an inorganic compound whose thermal decomposition product is an oxide which is a glass former, glass modifier or glass intermediate. The waste stream is introduced into a thermal treatment zone in which it is heated to form a melt phase, a crust phase and an aqueous phase. The inorganic compound is converted to the oxide and the oxide is concentrated in the melt phase. Volatiles are evaporated from the phases to form an off-gas which is scrubbed to provide a ventable flue gas and a condensate wherein the condensate is recycled to the thermal treatment zone. The melt phase is removed from the thermal treatment zone and cooled to form glass which is suitable for landfilling.

A further embodiment of the instant invention comprises an apparatus for the treatment of an aqueous waste stream of nonradioactive hazardous waste containing at least one inorganic compound capable of forming an oxide upon thermal treatment. The apparatus comprises a means for mixing the waste stream with a material selected from the group consisting of a glass former, a glass intermediate, a glass modifier, and mixtures thereof to form a combined stream. A means is provided for transferring the combined stream from the mixing means to a heating means. The heating means serves to heat the combined stream to form a melt phase with a crust phase thereon. In the heating means, the oxide is concentrated in the melt phase which is of a higher temperature than the crust phase. Volatiles which are evolved from both phases pass to a scrubbing means. The scrubbing means scrubs the volatiles with a caustic solution to form a condensate which can be recycled to the heating means and a flue gas which can be vented from the scrubbing means. A means is also provided for supplying caustic solution to the scrubbing means. The flue gas passes from the scrubbing means to a condensing means which receives the flue gas and forms a condensate and a vent gas. A means is also provided for receiving the melt from the heating means and cooling the melt to form solid shapes.

DESCRIPTION OF THE PREFERRED EMBODIMENTS

Figure 1:
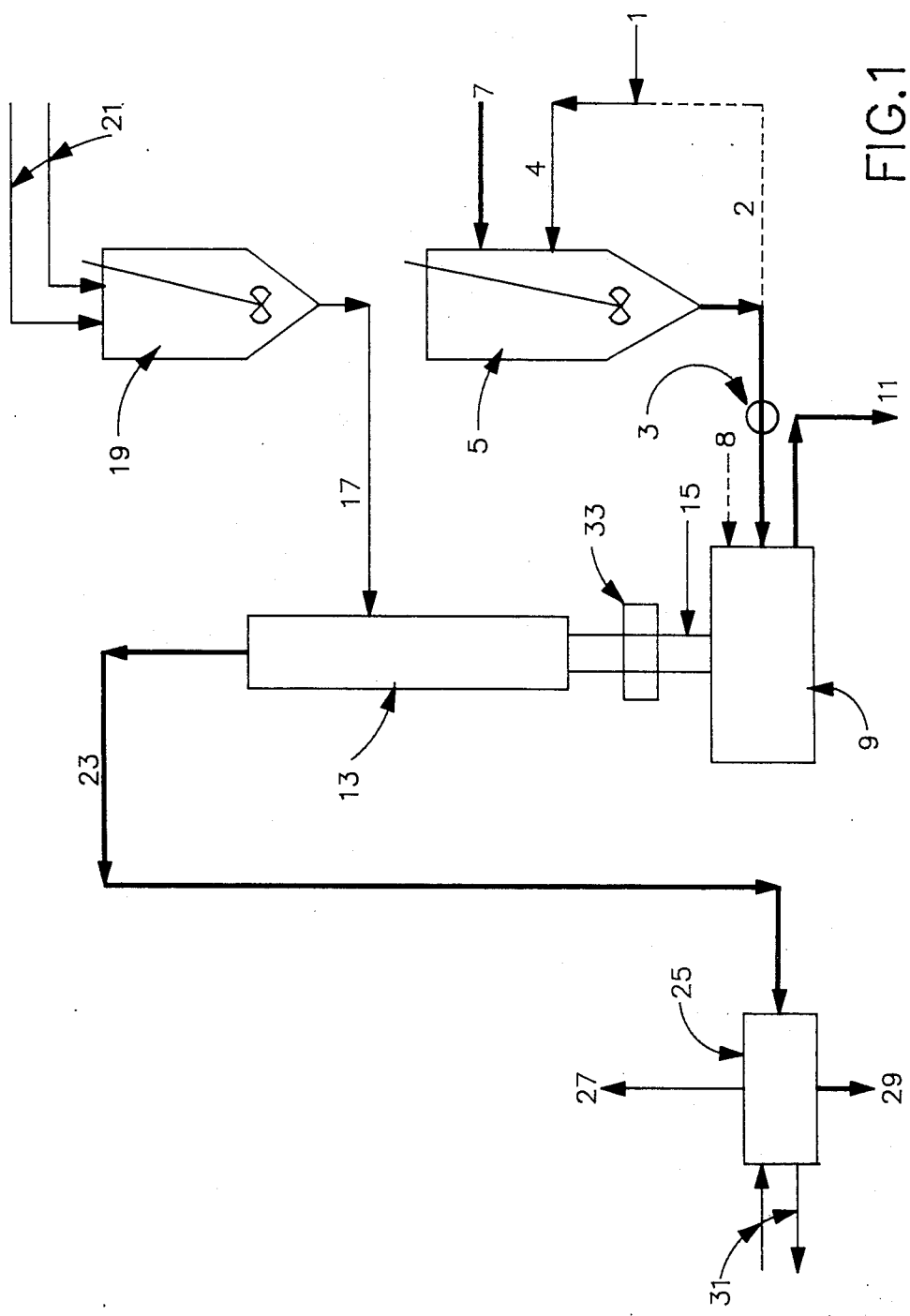
FIG. 1 is a schematic flow diagram for a preferred embodiment of the aqueous waste vitrification process.

In the instant process, an aqueous waste stream containing one or more inorganic salts or metal cations capable of forming an oxide(s) upon thermal treatment is introduced into a thermal treatment or heating zone. The oxide of the inorganic salt is a glass former, glass intermediate or a glass modifier. Additional material which comprises a glass former, glass intermediate, glass modifier and mixtures thereof is also added to the heating zone either separately or with the aqueous waste stream. The additional material is selected based on the desired composition of the melt phase described below in order to provide a nonleachable glass upon cooling.

Upon heating, the metal cations form the corresponding oxides and melt. Volatile components vaporize to form an off-gas which is scrubbed to provide a condensate which is recycled to the heating zone and a flue gas. The flue gas can be vented directly if environmentally acceptable or which can be subjected to additional treatment.

Additional advantages have been found when the instant process is operated to provide at least two phases corresponding to at least two temperature zones in the heating zone. It has been found that when a crust phase is maintained on top of the melt phase, the components of the crust dissolve to provide a more homogenous melt. Additionally, the crust serves to filter volatile materials from the melt and aid in minimizing the vaporization of such materials. This reduces the need for complex and expensive off-gas treatment.

It is particularly preferred that the process be operated in a continuous mode to maintain three phases, i.e. an aqueous phase, a crust phase and a melt phase. Water is continually evaporated from the aqueous phase with waste residual solids being deposited on the crust phase. The crust phase also serves as insulation between the high temperature melt phase and the lower temperature aqueous phase. Solids are deposited on the upper surface of the crust and are incorporated into the crust phase where some decomposition reactions and oxide forming reactions take place. Solids are dissolved from the lower surface of the crust and become part of the molten phase. Depending on the respective temperatures of the crust and melt phases, additional decomposition and/or oxide forming reactions can occur in the melt phase.

The wastes most beneficially treated by the instant process are those materials which remain hazardous even after thermal treatment or pyrolysis. If allowed to enter the environment these materials or their products of naturally occurring chemical reactions can create pollution problems due to their toxicity. Such materials are primarily inorganic materials particularly metallic salts which form oxides upon heating. Toxic metals whose salts are particularly suitable for this process include mercury, cadmium, lead, beryllium, nickel, vanadium, chromium, arsenic, barium, selenium and silver. The instant process can be used to treat waste streams containing a single toxic inorganic compound, or, more commonly, waste streams which contain several such compounds. It is contemplated that the waste streams which can be treated by the instant process can contain radioactive materials in such low levels as to not provide a toxicity problem, as for example, with naturally occurring background radioactive materials. Therefore, as used herein the term "nonradioactive" is intended to include such wastes.

As treated these materials are ordinarily dissolved or suspended in an aqueous stream. While there is no theoretical limitation on the concentration of these materials, as a practical matter it is preferred that the waste stream be as concentrated as possible while still remaining readily flowable. Since energy must be expended in order to evaporate the water it is preferred that the amount of water present be reasonably minimized. Ordinarily the waste stream will contain at least about 80 weight percent waste materials (based upon their oxides). While it is preferred that the waste materials be noncombustible the instant process can treat a waste stream containing up to about 4 weight percent combustible, i.e. oxidizable or decomposable, organic materials, without specifically providing an oxidizing atmosphere. However when there is more than about 5 weight percent combustible material present, it is necessary that an oxidizing atmosphere be provided above the liquid phase. This can be accomplished through the introduction of air, enriched air or oxygen.

A common toxic organic material which can be readily treated by the instant process is cyanide. Ordinarily, the waste streams will contain less than about 5 weight percent cyanide. However, the instant process can readily treat streams containing up to about 10 weight percent cyanide. Cyanide levels greater than about 10 weight percent can be treated, but at lower efficiencies.

The thermal treating can be accomplished by any means capable of providing a temperature sufficient to melt all of the components of the mixture. Preferably this temperature is in excess of 1000° C.; and more preferably, the temperature of the melt is between about 1000° C. and 1400° C. In order to minimize the loss of toxic vapors to the atmosphere, it is preferred that the apparatus be provided with a tight enclosure which can contain any vapors evolved in the heat treating environment. A device particularly suitable for the instant process is an electric glass melting furnace. While any electrode capable of providing the necessary heat flux and which is substantially unaffected by the waste materials in the melt can be used, a molybdenum electrode has been found to be particularly useful.

Glass formers, glass intermediates, glass modifiers, or mixtures of these materials can optionally be mixed with the aqueous waste stream or added directly to thermal treating zone. The type and amount of such materials which are introduced into the waste stream will depend upon the composition of the waste. In practice the waste is chemically analyzed in order to determine its components which are glass forming, glass intermediate and/or glass modifiers. A determination is then made of the final glass composition which will be required in order to provide a nonleachable vitrious material. The necessary amounts and types of the glass formers, glass modifiers and/or glass intermediates are added in order to provide the desired final glass composition. The composition of a large number of different glasses can be readily determined from handbooks such as the *CRC Handbook of Chemistry and Physics*, 55th Edition, CRC Press, pp. E-6 through E-9 (1974), (which is incorporated herein by reference). However this information does not indicate whether such materials will meet the governmental standards for leachability of components. Consequently, in practice it is ordinarily necessary to prepare a sample of the vitrious material and subject it to standardized leaching tests.

Before being delisted as a hazardous waste the vitrified product must pass the EP Toxicity Test specified in 40 CFR 261.24 (incorporated herein by reference). The test consists of the preparation of an extract followed by analysis of the extract for specific toxic substances. The procedure for extract preparation is described in 40 CFR 261, Appendix II titled, "EP Toxicity Test Procedure, Part A. Extraction Procedure (EP)" which is incorporated herein by reference. Methods for analyses of the extract are described in Document Number SW-846, published by the U.S. Environmental Protection Agency Office of Solid Waste and titled, "Test Methods for the Evaluation of Solid Wastes, Physical/Chemical Methods" (incorporated herein by reference). The EP Toxicity Tests are specific for the toxic metals As, Ba, Cd, Cr, Pb, Hg, Se and Ag.

The terms "glass" and "vitrious material" are used interchangeably herein to mean an inorganic product of fusion which is cooled to a rigid solid without undergoing appreciable crystallization.

Materials which are particularly useful in forming glasses, i.e. glass formers, include compounds of silicon, boron, germanium, arsenic, vanadium and phosphorus. For ease of operation it is preferred that the oxides of these materials be used although other compounds can be used as appropriate. Preferred glass formers include $B_2O_3$, $SiO_2$, $GeO_2$, $P_2O_5$, $V_2O_5$, and $As_2O_3$. It is particularly preferred that silica be used, for example, in the form of glass frit. Glass modifiers which can commonly be used include compounds of aluminum, boron, lithium, sodium, magnesium, zinc and calcium. It is particularly preferred that the oxides of these materials be used. Preferred glass modifiers include MgO, $Li_2O$, BaO, CaO, SrO, $Na_2O$ and $K_2O$. Although a number of glass intermediates can be beneficially used, the preferred glass intermediates include $Al_2O_3$, $Sb_2O_3$, $ZrO_2$, $TiO_2$, PbO, BeO, and ZnO. As used herein, the terms "glass formers", "glass modifiers" and "glass intermediates" have the meanings understood and used by those skilled in the glass forming art. In addition to those preferred materials cited hereinabove, other useful glass formers, glass modifiers and glass intermediates are listed in the *Glass Engineering Handbook*, third edition, by George W. McLellan and Errol B. Shand, published by McGraw Hill, 1984, which is incorporated herein by reference.

During operation of the instant process, there are at least two phases formed in the heating zone, i.e., a crust phase and a melt phase. Waste liquid which is introduced into the heating zone flashes or boils to a vapor. Depending upon the rate of introduction of the waste liquid there may or may not be a liquid phase existing in the heating zone. In a preferred embodiment of this process, a liquid phase is maintained in the heating zone. Upon vaporization of the waste liquid residual solids are deposited on a crust phase which covers and insulates a molten phase below. The melt phase can be continuously or periodically removed from the thermal treating zone depending upon the method of operation preferred.

Referring now to FIG. 1, the waste stream 1 can be pumped directly from a storage zone (not shown) to the thermal treating zone 9 through line 2 using a metering pump 3; or it can first be transferred through line 4 to a stirred mix tank 5 for sampling, analysis and blending with other wastes or additives. Glass formers and/or modifiers can optionally be added through line 7 into the mix tank or can be added through line 8 directly to the thermal treating zone 9. In the preferred method of operation, the glass formers and/or modifiers are added to the mix tank in order to provide the desired composition for the final melt product.

As discussed hereinabove the means for providing the thermal treatment of the waste can be any device capable of melting the components in the waste. A preferred device is a joule heated ceramic melter which consists of a carbon steel shell lined with two layers of refractory. The outer layer of the refractory is an insulating layer with the other layer being a hard face. The refractory forms a cavity into which the waste is introduced. Energy is provided to the waste by electrodes supplied with variable voltage power. Preferably these electrodes are molybdenum although any material which is substantially inert in the environment can be used. The cavity is provided with an overflow weir and spout 11, to allow periodic or continuous removal of the melt phase.

An evaporator-scrubber column 13 is provided to receive vapor passing from the thermal treating zone 9. A small volume of purge air 15 is provided to assist in the passage of the vapor from the thermal treating zone into the evaporator-scrubber column and to facilitate conversion of cations anc salts to oxides by maintaining an oxidizing atmosphere in the thermal treating zone. The vapor contains water and volatile decomposition products including acid gases of the waste materials. It is passed into the evaporator-scrubber column which is preferably packed with an appropriate material such as ceramic berl saddles or crushed glass. A caustic scrub solution 17 is introduced into the evaporator-scrubber column to strip acid gases from the water vapor by absorption and reaction with the caustic material. The caustic solution is provided as needed from a makeup tank 19. The caustic scrub solution passes in countercurrent flow to the waste gases through the evaporator-scrubber column to a tray which is designed to allow the passage of gas upward and the flow of liquid downward, for example, a bubble cap tray. The caustic scrub solution which has been contacted with waste vapor is returned to the thermal treating zone where the waste materials are further converted to glass compatible oxides. Makeup caustic solution is added to the scrub makeup tank through lines 21.

The waste vapor which has been scrubbed passes out of the evaporator-scrubber column through line 23 and subsequently to a condensor 25. Vapor is condensed from the off-gas stream and the condensate 29 is sampled prior to ultimate disposal. If the condensate contains only water and no hazardous components, it can be discharged through normal sewage disposal means. If hazardous materials are present, however, it can be recycled to the thermal treatment zone for additional treatment. Cooling water is supplied to and removed from the condensor through lines 31.

Non-condensable gases and a small amount of residual vapor are discharged to the atmosphere via line 27. Optionally, a means such as an electric powered fan (not shown) can be attached to line 27 in order to maintain the system at a slight negative pressure during operation and to prevent any leakage of hazardous vapors from the system.

Temperature of the melt in the thermal treating zone is monitored by thermocouples located at different levels in the cavity. These thermocouples also serve as a method of detection of the melt level.

Optionally a hinged section 33 can be provided to allow periodic removal of the melt by mechanical tilting of the thermal treating zone. Such a hinged section can be designed to allow the thermal treating zone to be tilted without decoupling it from the evaporator-scrubber column. In addition, it can allow liquid and gas to flow through it during the tilting process thereby allowing continuous operation of the system.

The following example is given for illustrative purposes only and is not mean to be a limitation on the subject invention.

EXAMPLE

An electroplating waste liquid containing about 95 weight percent water and about 5 percent salts is added to a stirred mix tank having a volume of about 500 liters. The waste consists of an acid solution containing 3-24 g/l $KAu(CN)_2$, 2-16 g/l Au as metal, and 0-100 g/l $K_2HPO_4$. Evaporation and thermal decomposition of this waste yields both glass formers, e.g. $P_2O_5$, and modifiers, e.g. $K_2O$. The waste liquid stream is added to the mix tank at the rate of about 31.5 liters per hour. Glass frit is introduced to the mix tank at the rate of 11.9 kilograms per hour. The mixed feed is pumped through a metering pump at the rate of 32 liters per hour at ambient temperature into a joule heated ceramic melter having a cavity volume of about 200 liters which corresponds to a cubic cavity of 0.6 meters on each side. The cavity is defined by hardface refractory which is in contact with the waste material and is approximately 0.15 meters thick on each side. This hardface refractory is surrounded by insulating refractory which is 0.30 meters thick. The refractory thickness is calculated to allow an outside shell temperature of about 120° C. The ceramic melter is equipped with two molybdenum electrodes with energy provided to the electrodes by a variable voltage AC power source. The power required is approximately 75 kilowatts at variable voltage (120-480 volts, 60 Hertz)

The waste material is heated to provide a melt temperature of 1250° C. A purge gas stream of air is introduced into the system below the evaporator-scrubber column at the rate of about 65 liters per hour. Waste vapor containing acid decomposition products together with the purge air passes directly into the evaporator-scrubber column which is connected to the ceramic melter. The evaporator-scrubber column is fabricated from three sections of standard flanged carbon steel pipe. The individual sections of the column are 0.3 meters in diameter and 0.8 meters in length. The total liquid holdup of the column is approximately 70 liters. Each section of the column is packed with a crushed glass packing. A scrub solution consisting of 0.5 molar sodium hydroxide solution is introduced to the top of each of the sections at a combined rate of 8.4 liters per hour. The liquid passes downward through the evaporator-scrubber column in countercurrent flow to the waste vapor. The acid gases from the thermal treating zone react with and/or are absorbed by the caustic solution. At the base of each section of the evaporator-scrubber column is a bubble cap tray designed to allow the upward passage of gas and the downward flow of liquid. The liquid which flows down the column passes through the bubble cap tray and into the thermal treating zone. The scrubbed waste vapor passes up through the evaporator-scrubber column at the rate of about 65,600 liters per hour and out through a line which is connected to a water cooled condensor. This condensor removes water vapor from the evaporator-scrubber off-gas and allows a clean gas stream to be vented to the atmosphere at the rate of about 63 liters per hour.

Glass melt is produced at the rate of about 14.4 kilograms per hour and is removed from the ceramic melter about every 30 minutes through an overflow spout. The glass melt is poured into molds and allowed to harden to form glass billets which are then transported to a landfill.

It will be understood that the above description of the present invention is susceptible to various modifications, changes and adaptations and the same are intended to be comprehended within the meaning and range of equivalents of the appended claims.

What is claimed is:

1. A process for the treatment of an aqueous waste stream of nonradioactive waste containing at least one inorganic compound comprising a hazardous metal cation capable of forming an oxide upon thermal treatment, wherein said oxide is a glass former, glass intermediate, or glass modifier, said process comprising:
    (a) introducing said waste stream into a thermal treatment zone;
    (b) heating said inorganic compound in said thermal treatment zone to convert said compound to the corresponding inorganic oxide and form a melt solution while vaporizing volatile components to form an off-gas;
    (c) scrubbing said off-gas to provide a ventable flue gas and a liquid condensate; and
    (d) removing said melt solution from said thermal treatment zone and cooling said solution to form a nonhazardous glass encapsulating the hazardous metal cation.

2. The process of claim 1 wherein a material selected from the group consisting of a glass former, a glass modifier, a glass intermediate, and mixtures thereof is introduced into said thermal treatment zone independent of said waste stream.

3. The process of claim 1 wherein a material selected from the group consisting of a glass former, a glass modifier, a glass intermediate, and mixtures thereof is combined with said aqueous waste stream before said stream is introduced into said thermal treatment zone.

4. The process of claim 1 wherein said off-gas is scrubbed with a caustic solution to remove acid gases and provide a condensate which is recycled to said heating zone.

5. The process of claim 1 wherein said hazardous waste contains up to about 10 weight percent cyanide said cyanide being decomposed in said thermal treating zone.

6. The process of claim 1 wherein said waste stream is heated in said thermal treatment zone to form a crust phase and a melt phase, said crust phase being on top of said melt phase and having a lower temperature than said melt phase.

7. The process of claim 6 wherein said waste stream is heated in said thermal treatment zone to form a melt phase, a crust phase and an aqueous phase.

8. The process of claim 7 wherein said stream is continuously introduced into said thermal treatment zone wherein liquid vaporizes from said aqueous phase depositing solids on said crust phase and solids from said crust phase are dissolved into said molten phase.

9. The process of claim 7 wherein a material selected from the group consisting of a glass former, a glass modifier, a glass intermediate and mixtures thereof is added to said thermal treatment zone to provide a melt composition which forms a nonleachable glass when cooled.

10. The process of claim 9 wherein said glass former is selected from the group consisting of glass frit, $B_2O_3$, $SiO_2$, $GeO_2$, $P_2O_5$, $V_2O_5$, and $As_2O_3$.

11. The process of claim 9 wherein said glass modifier is selected from the group consisting of MgO, $Li_2O$, BaO, CaO, SrO, $Na_2O$, and $K_2O$.

12. The process of claim 9 wherein said glass intermediate is selected from the group consisting of $Al_2O_3$, $Sb_2O_3$, $ZrO_2$, $TiO_2$, PbO, BeO, and ZnO.

13. A process for the treatment of an aqueous hazardous waste stream containing at least one inorganic compound whose thermal decomposition product is an oxide which is a glass former, glass modifier or glass intermediate which process comprises:
    (a) introducing said stream into a thermal treatment zone;
    (b) heating said stream in said thermal treatment zone to form a melt phase, a crust phase, and an aqueous phase;
    (c) converting said inorganic compound to said oxide and concentrating said oxide in said melt;
    (d) evaporating volatiles from said phases to form an off-gas;
    (e) scrubbing said off-gas to provide a ventable flue gas and a condensate;
    (f) returning said condensate to said thermal treatment zone; and
    (g) removing said melt from said thermal treatment zone and cooling said melt to form a glass.

14. The process of claim 13 wherein a material selected from the group consisting of a glass former, a glass intermediate, a glass modifier, and mixtures thereof is combined with said waste stream.

15. The process of claim 14 wherein said inorganic compound is selected from the group consisting of Ni, Hg, Pb, Co, Au, Ag, Cr, Cd, Se, Sb, As, and Cu, the temperature of said melt phase is between about 1000° C. and 1400° C.

16. The process of claim 15 wherein a glass former selected from the group consisting of $SiO_2$, $P_2O_5$, and mixtures thereof is combined with said waste stream.

17. The process of claim 13 wherein said waste stream contains a plurality of inorganic compounds.

18. An apparatus for the treatment of an aqueous waste stream of nonradioactive hazardous waste containing at least one inorganic compound capable of forming an oxide upon thermal treatment, said apparatus comprising:
    (a) a means for mixing tne waste stream with a material selected from the group consisting of a glass former, a glass intermediate, a glass modifier, and mixtures thereof to form a combined stream;
    (b) a means for heating said combined stream to form a melt phase with a crust phase thereon, wherein said oxide is concentrated in said melt phase and said melt phase is of a higher temperature than said crust phase, and wherein volatiles are being evolved from said phases;
    (c) a means for transferring said combined stream from said mixing means to said heating means;

(d) a scrubbing means adapted to receive said volatiles from said heating means and scrub said volatiles with a caustic solution to form a condensate which is recycled to said heating means and a flue gas which is vented from said scrubbing means;

(e) a means for providing said caustic solution to said scrubbing means;
(f) a condensing means for receiving said flue gas from said scrubbing means and forming a condensate and a vent gas; and
(g) a means for receiving the melt from said heating means and cooling said melt to form solid shapes.

* * * * *

UNITED STATES PATENT AND TRADEMARK OFFICE
CERTIFICATE OF CORRECTION

PATENT NO. : 4,666,490
DATED : May 19, 1987
INVENTOR(S) : Ronald N. Drake

It is certified that error appears in the above—identified patent and that said Letters Patent is hereby corrected as shown below:

In Column 7, line 30, please delete the word "anc" and insert therefor -- and --.

In Column 10, Claim 18, line 57, please delete the word "tne" and insert therefor -- the --.

Signed and Sealed this

Thirteenth Day of October, 1987

Attest:

DONALD J. QUIGG

*Attesting Officer*  *Commissioner of Patents and Trademarks*